March 26, 1935. G. W. CLARK 1,995,796
RESILIENT MOUNTING FOR BICYCLE FRAMES
Filed May 17, 1934
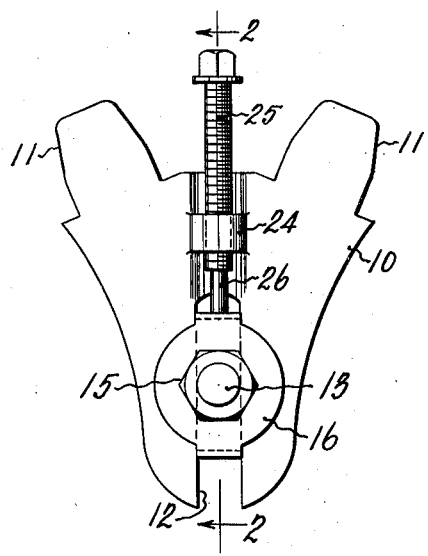
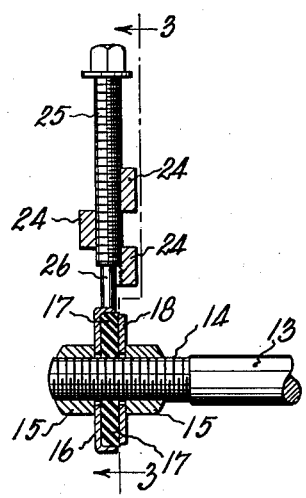
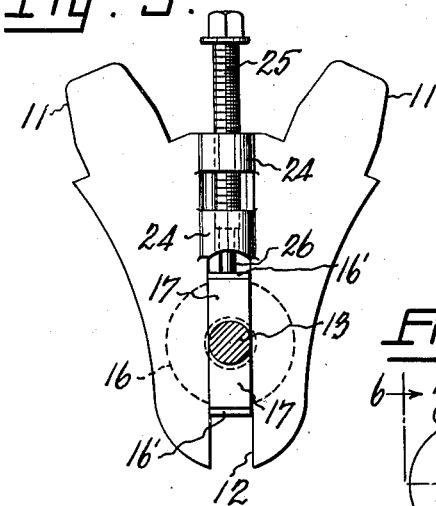
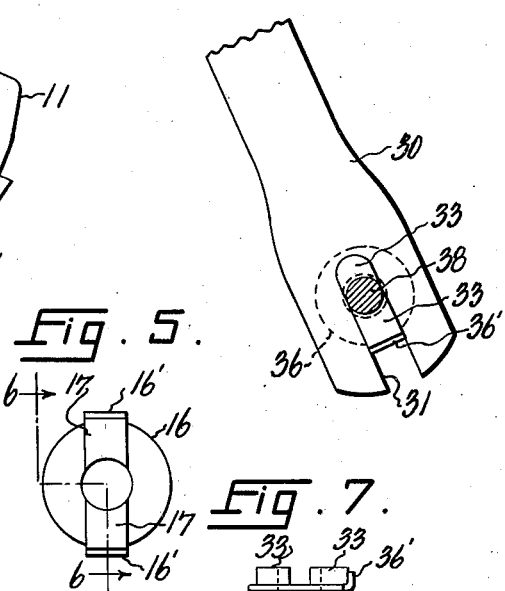
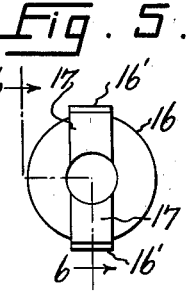
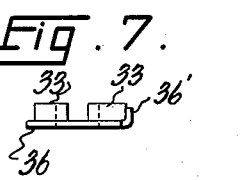
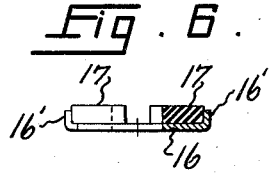
INVENTOR
GEORGE W. CLARK
BY Chapin & Neal
ATTORNEYS Patented Mar. 26, 1935

1,995,796

UNITED STATES PATENT OFFICE 1,995,796

RESILIENT MOUNTING FOR BICYCLE FRAMES

George W. Clark, Westfield, Mass., assignor to The Westfield Manufacturing Company, Westfield, Mass., a corporation of Massachusetts Application May 17, 1934, Serial No. 726,068

5 Claims. (Cl. 208—101)

This invention relates generally to an improvement in bicycle construction and particularly in the means for mounting the wheels in the frame to avoid rattle.

Heretofore even brand new bicycles, made according to the best custom, give forth a metallic rattle when jounced up and down. It occurs even when all parts are apparently fitted properly together and adjusted right. I have located this objectionable rattle as coming from the wheel mounting.

The major object of my invention is to improve the means for mounting the wheels in the frame and to do this in an efficient manner. Detail objects of the invention will be apparent from the following specification and accompanying drawing.

Referring to the drawing,

Fig. 1 is a side view showing the mounting assembly in the rear fork member of the bicycle frame at one side, with only those parts shown which are desirable to understanding my disclosure;

Fig. 2 is a section substantially on line 2—2 of Fig. 1;

Fig. 3 is a view similar to Fig. 1 but with parts broken away;

Fig. 4 is a view similar to Fig. 1 but showing the mounting assembly at the front fork of the bicycle;

Fig. 5 is a detail view of the preferred form of one of the new mounting members for use in the rear fork assembly.

Fig. 6 is a section on line 6—6 of Fig. 5; and

Fig. 7 is a similar view of the preferred form for use in the front fork assembly.

The present invention is a result of my work and experience with an earlier invention disclosed in my application Serial No. 713,136 filed February 27, 1934. The drawing herein is similar to those of my previous application except in the details of the new disclosure.

Referring to the drawing, 10 indicates one of the end members of the rear fork of a bicycle frame. The member 10 illustrated is in the form of a stamped plate having lugs 11 by which the plate is connected to the frame and an open-ended slot 12 which receives one end of the shaft 13 (a similar construction receiving the other end) upon which the rear wheel of the bicycle is rotatably mounted in a well known manner. The ends of shaft 13 are threaded as indicated at 14 and the shaft is adapted to be held in longitudinally adjusted position by means of nuts 15 positioned on opposite sides of fork member 10.

In one form of this invention, I position between one nut and the plate 10 a washer 16. The washer has diametrically opposite ears 16' of a width to fit loosely in slot 12, see Fig. 5. The washer is provided with two pads of shock insulating material 17 which may be of rubber or the like and preferably reinforced with fabric in laminated form. One pad 17 extends from one ear 16' to the edge of the washer hole and one pad from the other ear to the opposite edge of the washer hole. The width of these pads is substantially the width of open slot 12 or just enough less to make an easy fit. And in this form of the invention the thickness of the pads is substantially the thickness of the walls of open slot 12, or just enough more to make the pressure from an ordinary washer 18 squeeze pads 17 into a binding fit in slot 12 when the nuts 15 outside of each washer 16 and 18 are drawn together to bind the assembly. The pads 17 then fill slot 12 between ears 16' and the shaft 13. The pads are preferably just long enough so that the shaft can fit between them loosely before the assembly is tightened up and so that the pads will be spread lengthwise for the ends to bear against the shaft tightly when the assembly is tightened up.

With this structure it will be seen that the parts of the bicycle can be made in the ordinary way, to the ordinary dimensions and the only new elements of the combination in the mounting are the washer 16 with its ears 16' and the pads 17. The pads 17 can be squeezed tightly between washers 16 and 18. This squeezing tends to flatten the pads in all directions parallel to the planes of the washers. And this fills up the spaces between the shaft 13 and the walls of slot 12 all around shaft 13 and between the shaft and the ears 16' of washer 16. The amount of spreading action is deliberately provided for so as to be quite small, for pads 17 to perform their function in resiliently binding the shaft mounting. In this action the metal ears 16', the side walls of slot 12, and the shaft 13 act as definite and close limits to the spreading action of the pads. So the latter do not need to and cannot be distorted to any destructive extent.

One advantage of this result is that no spreading or other distortion of the pads 17 can materially affect the desired position of the shaft as accurately tightened up in its fork for bicycle use. It frequently happens that during use one desires to adjust the rear shaft after the bicycle leaves the factory. And my arrangement provides against destructive distortion of the rattle-preventing pads so that they will cooperate through a long life for the desired adjustment of the bicycle at the wheel mounting point.

The members 10 are provided with oppositely struck-out portions 24 interiorly threaded to receive an adjustment screw 25 having a reduced end 26 adapted to pass down centrally of the slot 12 and bear on the top ear 16' of washer 16. The screw 25 itself functions in a well known manner to assist in accurately adjusting the position (and holding the adjustment) of the rear wheel so that it will run true between the forks and in proper relation to the driving sprocket and chain.

By having screw 25 bear on the metallic ear 16' of washer 16, and by caging the rubber pads 17 as described, the accurate adjustment of the rear wheel is not adversely affected by the yielding of the shock absorbing elements upon prolonged and severe use of the bicycle.

My new construction gives a sufficient solidity to the mounting for all adjusting purposes and at the same time gives just enough shock absorbing action to avoid rattle due to prior art metal-to-metal transmission of shock vibration through the wheel shaft mounting. The idea involved is more for the purpose of avoiding the rattle than cushioning the rider. The difficulty has been to locate the best place to stop the rattle and find a simple and efficient means to do it without increasing the manufacturing cost enough to limit its use. The simplicity of the new elements shown in Figs. 5, 6, and 7 accomplish my economical purpose. They cooperate in a new and useful way with the old elements of the bicycle wheel mounting to accomplish functions desired.

Referring to Fig. 4 showing one element of the front fork, it will be clear, from what has been said, how the front shaft 38 is mounted in substantially the same manner as the rear shaft. The difference is that (as shown in Fig. 7) front washer 36 need have only one ear 36' corresponding to one ear 16' of washer 16. The top pad 33 can rest against the end of open slot 31 in the front slot. This gives the same effect as if two ears were used on the washer. It is possible because the front wheel does not need to be adjusted in its fork between such wide limits as the rear wheel.

Variations of the specific structure will readily occur to one who studies my disclosure. For example, one may make two washers exactly like that shown in Fig. 5 or in Fig. 6 or in Fig. 7. By using the two of the same total pad thickness and ear length as that previously described, they could be matched from opposite sides of fork member 10 or 30 and the same result obtained in essentially the same way. It might be found more convenient in some cases to use only one special form of washer carrying the pads stuck on the washer for assembly purposes. In other cases two special forms of washers will be found of advantage, one on each side of the fork element binding an end of the shaft.

Having disclosed my invention, I claim:

1. In a bicycle the combination of the rear fork member having open-ended slots to receive the wheel shaft, the wheel shaft in said slots, the washers on opposite sides of the fork member, the nuts on the shaft to move the washers against the fork and to hold the shaft in place, said washers having inturned ears which fit and slide within the open-ended slot, shock cushioning means laid between the washers and within the open-ended slots of the fork between the washer openings and said ears, said cushioning means having sufficient bulk to spread and resiliently tighten the mounting within said slots when the nuts are tightened against the washers to hold the wheel shaft in place.

2. In a wheel mounting for a bicycle the combination of a frame element having an opening, a wheel shaft extending through the opening, washers and nuts located on opposite sides of the opening, shock absorbing means in the opening adapted to be spread into binding relation with the shaft by pressure exerted by the washers and nuts, one of said washers having ears entering the opening for contact with the shock absorbing means to hold it from spreading away from the shaft as the pressure is applied.

3. In bicycle structure for the purpose described the combination of a washer having diametrically opposed ears on its outer edge extending in a plane at right angles to the washer, two shock absorbing pads one extending from each ear to the rim of the washer, the width of said pads being about equal to the diameter of the washer opening.

4. In a bicycle structure for the purpose described a washer, two shock absorbing pads assembled to extend radially from the hole of the washer towards its outer rim and of a width about that of the washer hole and means to spread the shock absorbing pads towards the hole for binding a wheel shaft, said means including enclosing walls for the pads to avoid spreading of the pads away from the shaft.

5. Shock absorbing structure for avoiding rattle in the mounting of bicycle wheels, comprising cushioning pads adapted to fit in the end slots of the bicycle forks and extend across from side wall to side wall of each slot and for the thickness of the slot, a pair of such pads in each slot being adapted to extend in the slot above and below a wheel shaft mounted in the slot; rigid means including the slot walls to encompass said pads on all sides and means to squeeze the pads into binding relation to the wheel shaft mounted in each bicycle fork member, the encompassing walls of said pads preventing sufficient relative movement of the latter to change the desired adjustment of the shaft by any independent movement of said pads.

GEORGE W. CLARK.